United States Patent [19]

Simmersbach et al.

[11] 4,002,434
[45] Jan. 11, 1977

[54] PROCESS FOR THE PRODUCTION OF ABRASION RESISTANT PERBORATE MONOHYDRATE

[75] Inventors: Edmund Simmersbach, late of Willaringen-Egg, Germany, by Ingeborg Simmersbach, heiress; Artur Schaller, Rheinfelden, Germany

[73] Assignee: Deutsche Gold- und Silber-Scheideanstalt vormals Roessler, Frankfurt, Germany

[22] Filed: Feb. 17, 1972

[21] Appl. No.: 227,307

[30] Foreign Application Priority Data

Jan. 25, 1972  Germany ............... 2203285

[52] U.S. Cl. .................. 23/293 R; 23/302 T; 23/313 R; 23/300; 423/281
[51] Int. Cl.$^2$ .......................... B01J 17/02
[58] Field of Search ............. 23/300, 302, 293 R, 23/293 A, 313; 423/279, 281, 280

[56] References Cited

UNITED STATES PATENTS

| 2,491,789 | 12/1949 | Young ............... 423;252/281 |
| 2,706,178 | 4/1955 | Young ............... 23;252/313 |
| 2,773,738 | 12/1956 | Ball et al. ............... 23/302 |
| 3,348,907 | 10/1967 | Pellens et al. ............... 423;23/281 |
| 3,623,836 | 11/1971 | Denaeyer ............... 423;23/281 |

FOREIGN PATENTS OR APPLICATIONS 1,065,832  4/1967  United Kingdom ............... 423/280

Primary Examiner—Frank W. Lutter
Assistant Examiner—Frank Sever
Attorney, Agent, or Firm—Cushman, Darby & Cushman

[57] ABSTRACT

Abrasion resistant sodium perborate monohydrate is prepared by treating sodium perborate monohydrate with at least 5% of water at a temperature of 20° – 90° C. in a moistening unit and then drying at a temperature beginning at 40° C. and increasing to a maximum of 90° C.

13 Claims, No Drawings

PROCESS FOR THE PRODUCTION OF ABRASION RESISTANT PERBORATE MONOHYDRATE

It is known according to German patent No. 970,495 to produce sodium perborate monohydrate from sodium perborate tetrahydrate by over drying in a fluidized bed. The monohydrate thus formed, however, is abrasion resistant only if the production takes place in discontinuous fashion. In order to continuously obtain an abrasion resistant product according to German published application No. 1,930,286, the temperature of the drying air must be raised to at least 180° C. Various difficulties occur thereby. Thus a portion of the tetrahydrate melts without being dehydrated and cakes with the already dehydrated tetrahydrate so that crusts are formed which are unusable.

It has now been found that abrasion resistant sodium perborate monohydrate can be produced from normal monohydrate in a technically simple manner, without changing the active oxygen content and speed of solution, if the monohydrate is mixed with at least 5 weight % of water based on the monohydrate in a moistening unit or apparatus at a temperature of 20° – 90° C. and is subsequently dried at a temperature beginning at 40° C. and increasing to a maximum of 90° C. The amount of water employed can be as much as 30% of the monohydrate by weight.

As "moistening units" there can be used known devices such as mixers, torque tubes and conveyors, for example, which permit the moistening of the monohydrate with water. The water can be mechanically stirred in. Preferably, however, it is sprayed on the monohydrate.

The monohydrate is generally added at the temperature at which it leaves the production apparatus or comes from the ware house. Naturally it is also possible to cool the monohydrate after leaving the production apparatus to a lower temperature just before the spraying.

The process can be carried out continuously or discontinuously (batchwise). For continuous operation especially suitable for moistening units with spraying contrivances. In these units the entering monohydrate is homogeneously sprayed. The sprayed product trickles from the spray mixer into a dryer of conventional type in which it is heated to 40° – 90° C. After passing a distance of cooling there is obtained the hardened monohydrate. The monohydrate treated with water has definitely become abrasion resistant.

In general 5 – 30% of water, preferably 15 – 25%, is added based on the weight of the water.

The spraying temperatures can be from 20° – 90° C.

While pure water can be employed it has also been found that abrasion resistant sodium perborate monohydrate can be obtained with dilute, aqueous solutions which contain more than 0%, preferred 2 to 10% by weight of materials which do not negatively influence the active oxygen content or the speed of solution, that is they do not lower the active oxygen content or increase the solubility time.

As material of this type there can be used easily volatile compounds i.e. compounds with boiling points not over 100° C such as water soluble lower alcohols such as methanol, ethanol, isopropanol, propanol, lower ethers such as diethyl ether, dimethyl ether, ethyl propyl ether, dipropyl ether, high molecular weight water soluble alcohols such as polyvinyl alcohol or ketones such as acetone and methyl ethyl ketone.

Also there can be employed certain salt solutions such as solutions of sodium metaborate, sodium perborate, sodium silicate borax and phosphates. The concentration in the solution must be so chosen that there results only an insignificant reduction of the active oxygen and increase of the time of solution.

Unless otherwise indicated all parts and percentages are by weight.

The invention will be further explained in the following examples.

EXAMPLE 1

There were introduced into a revolving drum 26 cm. long and 27 cm. in diameter (35 revolutions per minute) 2000 grams of sodium perborate monohydrate $NaBO_2 \times H_2O_2$ and it was sprayed with 600 grams of water at 20° C. The spray nozzle had an opening of 0.5 mm., the liquid pressure amounted to 3 atmospheres absolute. Then the sprayed monohydrate was dried in a preheated fluidized bed drier. The initial temperature was 40° C. and it was increased to 90° C. within 20 minutes.

The original active oxygen content of 15.5% remained unchanged after the hardening.

Likewise the original speed of solution was not changed. In both cases 1 gram of the monohydrate completely dissolved in 500 cc. of water within 15 seconds.

The abrasion was determined as follows.

50 grams of the product was sieved on an oscillating screen for 5 minutes. Then each fract was again sieved; namely in the presence of 3 rubber cubes, each weighing 9 grams. This second sieving lasted for 10 minutes. As "dust" there was designated the increase in the sieve fraction under 0.2 mm. width of screen.

UNHARDENED MONOHYDRATE

1a. Oscillating screen without cubes, i.e. distribution in fractions:

| in mm. | 0.8 | 0.4 | 0.2 | dust |
|---|---|---|---|---|
| in weight% | 1 | 84 | 14 | 1 |

1b. Abrasion of the individual fractions on the oscillating screen with 3 rubber cubes:

| in mm. | 0.8 | 0.4 | 0.2 | dust |
|---|---|---|---|---|
| in weight% | 0 | 12 | 44 | 44 |

The abrasion, i.e. the increase of the fraction under 0.2 mm. amounted to 43%.

HARDENED MONOHYDRATE OF THE INVENTION

2a. Oscillating screen without cubes, i.e. distribution in fractions:

| in mm. | 0.8 | 0.4 | 0.2 | dust |
|---|---|---|---|---|
| in weight% | 0 | 64 | 28 | 8 |

2b. Abrasion of the individual fractions on the oscillating screen with 3 rubber cubes:

| in mm. | 0.8 | 0.4 | 0.2 | dust |
|---|---|---|---|---|
| in weight% | 0 | 51 | 33 | 16 |

The abrasion of monohydrate treated according to the invention, i.e. the increase in the fraction under 0.2 mm. amounted to only 8% compared to 43% with the normal monohydrate.

EXAMPLE 2

This experiment was carried out in such a manner that there was continuously added to the mixing apparatus described in example 1 sodium perborate monohydrate in an amount of 270 grams/minute and it was continuously sprayed with 86 grams of water/minute. The spraying took place with a nozzle having a diameter of 0.5 mm at 3 atmospheres absolute pressure. The drying followed at 40° – 90° C. as in example 1. The original active oxygen content was 15.5% and it was retained after the hardening. Likewise the original speed of solution was not changed.

The abrasion test described in example 1 showed the following results for the hardened monohydrate:

2a. Oscillating screen without cubes, i.e. distribution in fractions:

| in mm. | 0.8 | 0.4 | 0.2 | dust |
|---|---|---|---|---|
| in weight% | 5 | 76 | 19 | 0 |

2b. Abrasion of the individual fractions on the oscillating screen with 3 rubber cubes:

| in mm. | 0.8 | 0.4 | 0.2 | dust |
|---|---|---|---|---|
| in weight% | 0 | 62 | 27 | 11 |

The abrasion of monohydrate treated according to the invention, i.e. the increase of the fraction under 0.2 mm. amounted to only 11% compared to 43% with normal monohydrate.

When aqueous solutions of other materials are employed, the additional material should be used in an amount which does not reduce the active oxygen content of the sodium perborate monohydrate below 15% and does not increase the time for complete dissolution of the monohydrate above 0.5 minutes. Generally the amount of water soluble material is 2 to 10% by weight of the solution. In addition to the materials previously mentioned, an especially preferred water soluble material is hydrogen peroxide.

EXAMPLE 3

In the mixing apparatus described in Example 1 there were added 2000 grams of sodium perborate monohydrate $NaBO_2 \times H_2O_2$ and it was sprayed with 400 grams of a 10% by weight aqueous solution of sodium metaborate $NaBO_2$ at 20° C. The spray nozzle had an opening of 0.5 mm. and the liquid pressure was 3 atmospheres absolute. The sprayed monohydrate was then dried in the same manner as Example 1 at 40 to 90° C. in a period of 20 minutes. The active oxygen content was reduced from 15.58% to 15.10% and the time for complete solution increased from 0.06 minutes to 0.3 minutes.

The abrasion of the product was determined as in Example 1.

| Abrasion of the unhardened monohydrate | 38% |
|---|---|
| Abrasion of the hardened monohydrate | 13% |

EXAMPLE 4

In the mixing apparatus as in Example 1, there were added 2000 grams of sodium perborate monohydrate $NaBO_2 \times H_2O_2$ and it was sprayed with 421 grams of a 5% aqueous solution of methanol using the same nozzle and liquid pressure as in Example 3. Drying was carried out as in Example 1 at 40°–90° C. for 20 minutes. The original active oxygen content of 15.58% remained unchanged after hardening. The time for dissolution increased from 0.06 minutes for unhardened monohydrate to 0.2 minutes for hardened monohydrate.

Abrasion of the unhardened monohydrate was 38% and abrasion for the hardened monohydrate was 29%.

EXAMPLE 5

There were added to the same mixing apparatus as in Example 1, 2000 grams of sodium perborate monohydrate and it was sprayed with 408 grams of a 2% aqueous hydrogen peroxide solution at room temperature using the same spray nozzle and liquid pressure as in Example 1. The sprayed monohydrate was dried as in Example 1 at 40°–90° C. for 20 minutes. The active oxygen content of the monohydrate increased from 15.58% for the initial material to 15.96% for the hardened product.

The time of solution for the hardened monohydrate was 0.2 minutes.

| Abrasion of the unhardened monohydrate | 38% |
|---|---|
| Abrasion of the hardened monohydrate | 17% |

In the following table, there is set forth the results of an abrasion test similar to that described in Example 1 except that there was also used an 0.1 mm. screen.

TABLE

| | 1 | 2 | 3 | 4 | 5 | 6 |
|---|---|---|---|---|---|---|
| Sieve Analysis | | | | | | |
| on 0.8 mm.screen % | 1 | 1 | 2 | 8 | 1 | 1 |
| on 0.4 mm.screen % | 73 | 70 | 69 | 60 | 60 | 54 |
| on 0.2 mm.screen % | 25 | 28 | 27 | 28 | 33 | 39 |
| on 0.1 mm.screen % | 1 | 2 | 2 | 4 | 6 | 6 |
| Dust % | 0 | 0 | 0 | 0 | 0 | 0 |
| Bulk Density (g/l) | 511 | 580 | 615 | 628 | 592 | 615 |

TABLE-continued

| | 1 | 2 | 3 | 4 | 5 | 6 |
|---|---|---|---|---|---|---|
| % Active Oxygen | 15.58 | 15.68 | 15.10 | 16.12 | 15.70 | 15.96 |
| Abrasion as in Example 1, weight % | 38 | 32 | 13 | 34 | 29 | 17 |
| Time of solution (min.) | 0.06 | 0.2 | 0.3 | 0.3 | 0.2 | 0.2 |

In the above table the six samples were:

1. The sodium perborate monohydrate starting material.
2. 2000 gr of monohydrate sprayed with 400 gr of a 10% aqueous solution of methanol.
3. 2000 gr of monohydrate sprayed with 400 gr of a 10% aqueous solution of $NaBO_2$.
4. 2000 gr of monohydrate sprayed with 400 gr of a 10% aqueous solution of $H_2O_2$.
5. 2000 gr of monohydrate sprayed 421 gr of 5% aqueous methanol.
6. 2000 gr of monohydrate sprayed 408 gr of 2% aqueous $H_2O_2$.

What is claimed is:

1. A process for the production of abrasion resistant sodium perborate monohydrate comprising treating preformed sodium perborate monohydrate in a moistening unit by adding water in an amount of 5 to 30 weight % of the sodium perborate monohydrate at a temperature of 20°–90° C. and then drying the monohydrate at a temperature beginning at 40° C. and increasing to a maximum of 90° C.
2. A process according to claim 1 wherein the water is used in an amount of 15 to 25 weight % of the monohydrate.
3. A process according to claim 1 wherein the water is sprayed on the monohydrate.
4. A process according to claim 1 wherein the water is pure water.
5. A process according to claim 1 wherein the water contains a water soluble material in an amount which does not adversely affect the active oxygen content or the solubility time of the monohydrate.
6. A process according to claim 5 wherein the water soluble material is an alcohol.
7. A process according to claim 5 wherein the water soluble material is sodium metaborate, sodium perborate, borax sodium silicate or phosphates.
8. A process according to claim 7 wherein the water soluble material is sodium metaborate.
9. A process according to claim 8 wherein the water contains 10% of the sodium metaborate.
10. A process according to claim 5 wherein the water soluble material is hydrogen peroxide.
11. A process according to claim 10 wherein the water contains 2% hydrogen peroxide.
12. A process according to claim 5 wherein the water soluble material is methanol, ethanol, isopropanol, propanol, diethyl ether, dimethyl ether, ethyl propyl ether, dipropyl ether, polyvinyl alcohol, acetone or methyl ethyl ketone.
13. A process according to claim 5 wherein the water soluble material is present in an amount of 2 to 10% of the aqueous solution and is methanol, ethanol, isopropanol, propanol, polyvinyl alcohol, diethyl ether, dimethyl ether, ethyl propyl ether, dipropyl ether, acetone, methyl ethyl ketone, sodium metaborate, sodium perborate, borax, sodium silicate or phosphate.

* * * * *